July 24, 1951
M. L. D'ORNELLAS
2,561,503
MULTIPLE WHEEL COMPARTMENT PROJECTOR
Filed July 7, 1948
8 Sheets—Sheet 2
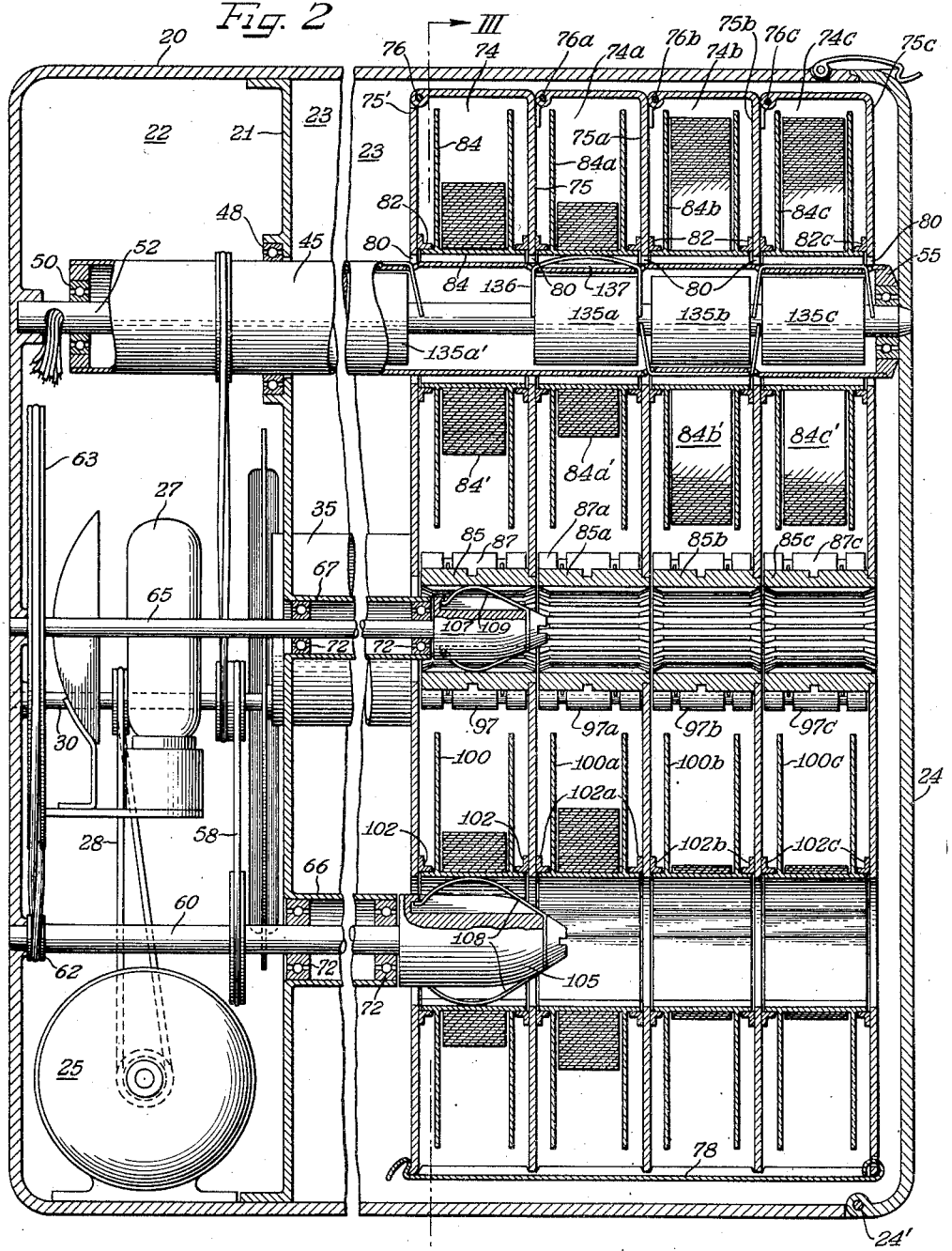
Inventor
Manuel L. d'Ornellas
by The firm of Charles H. Lill Attys

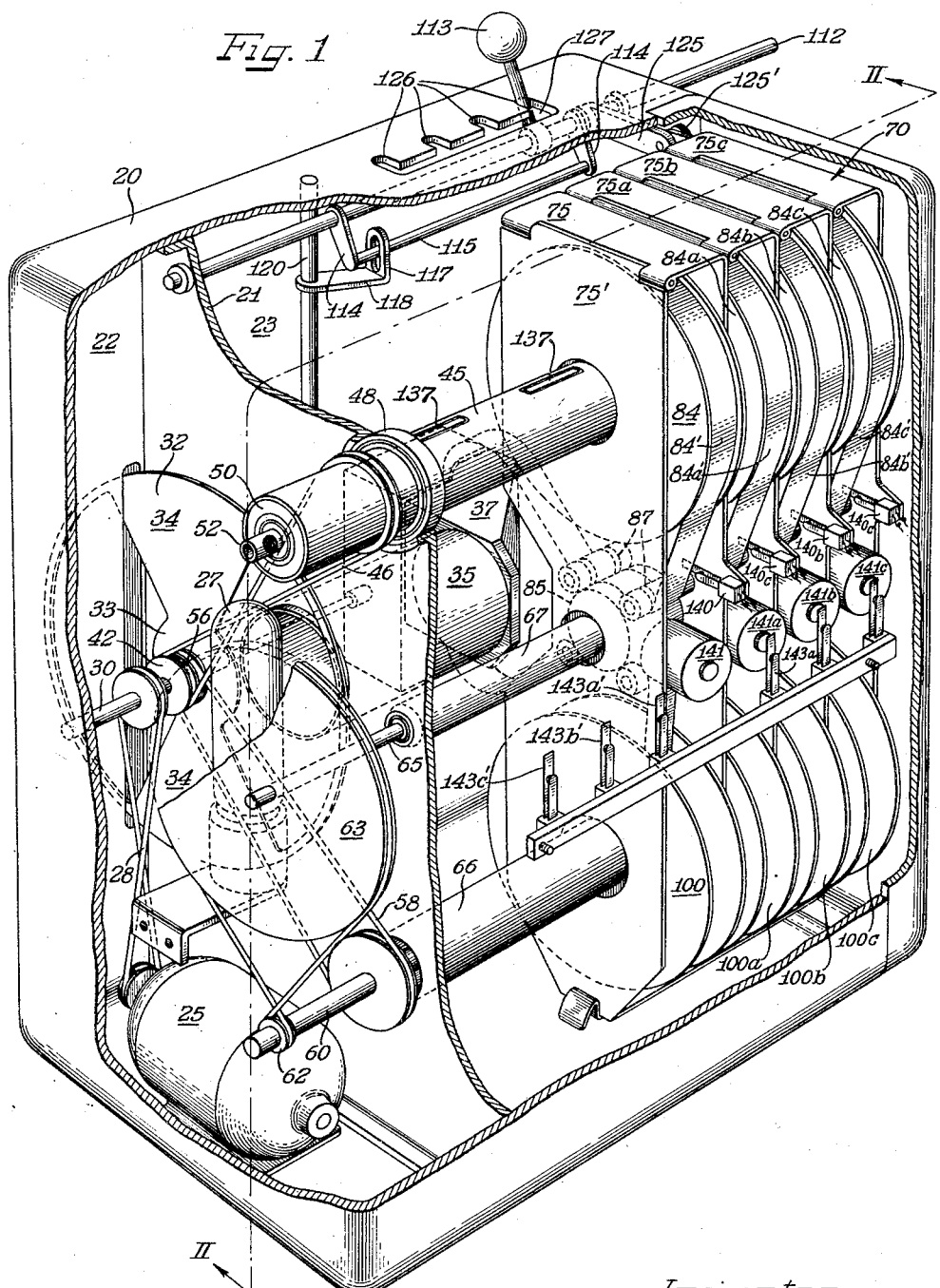

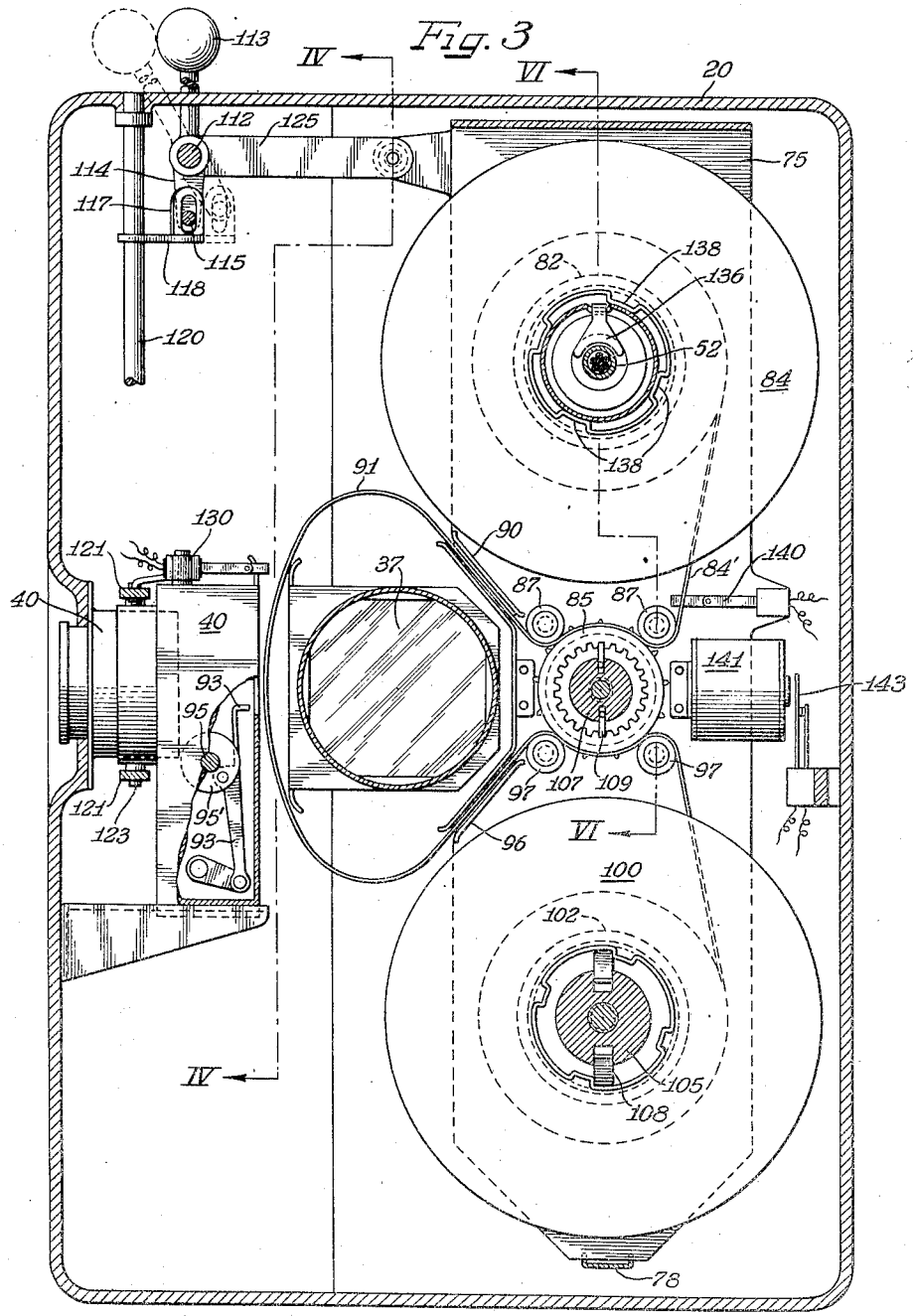

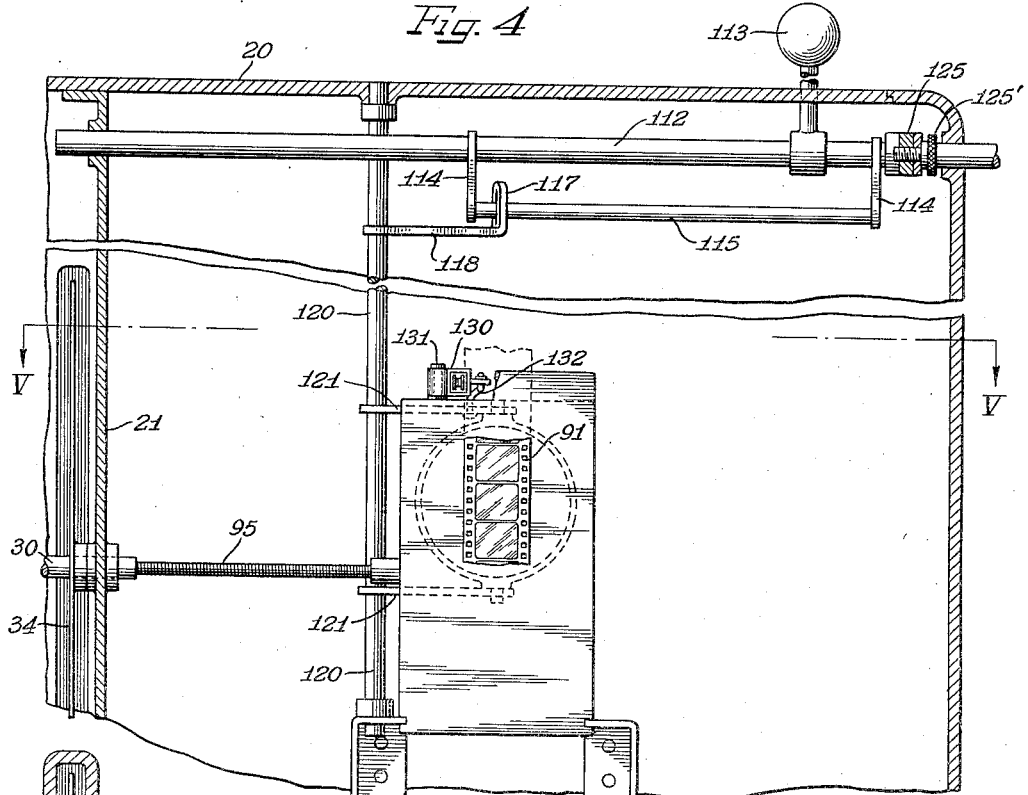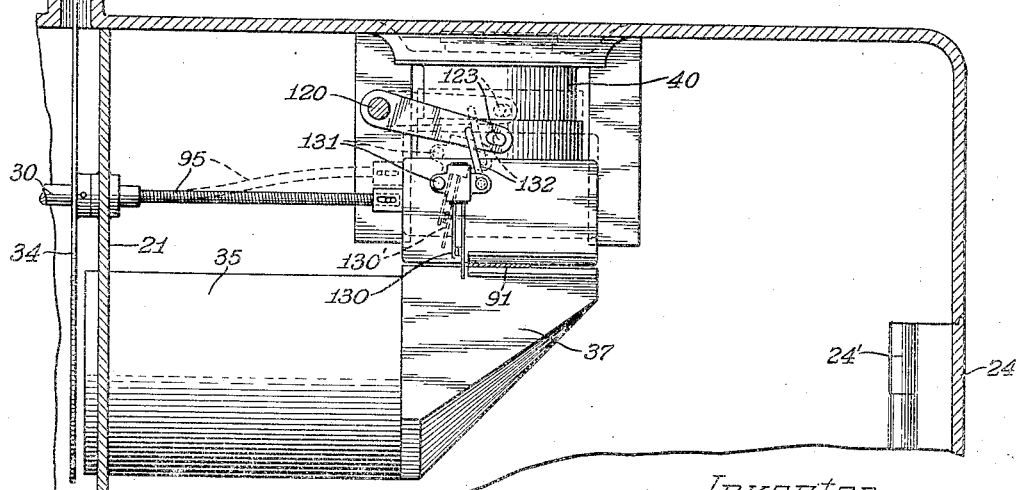

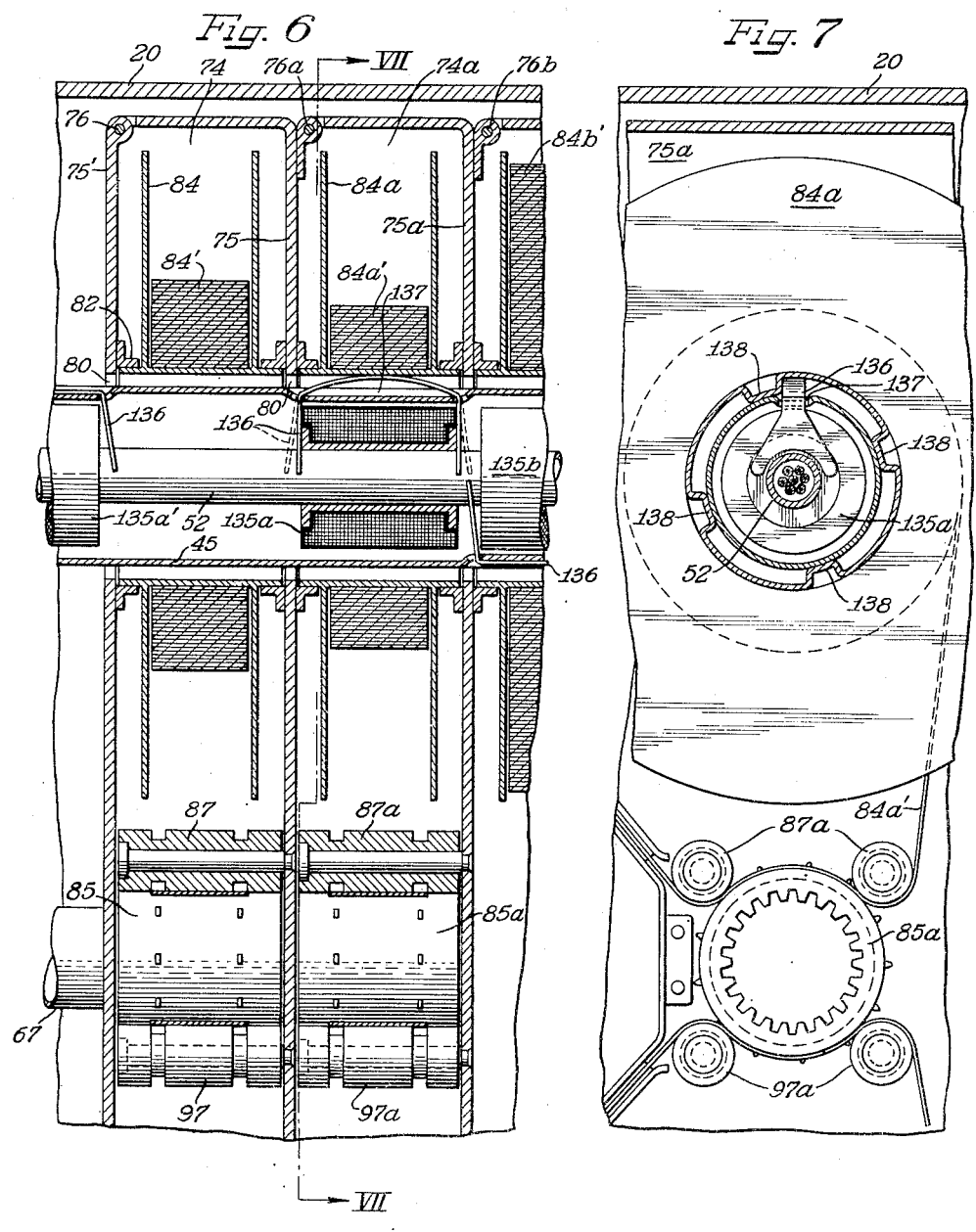

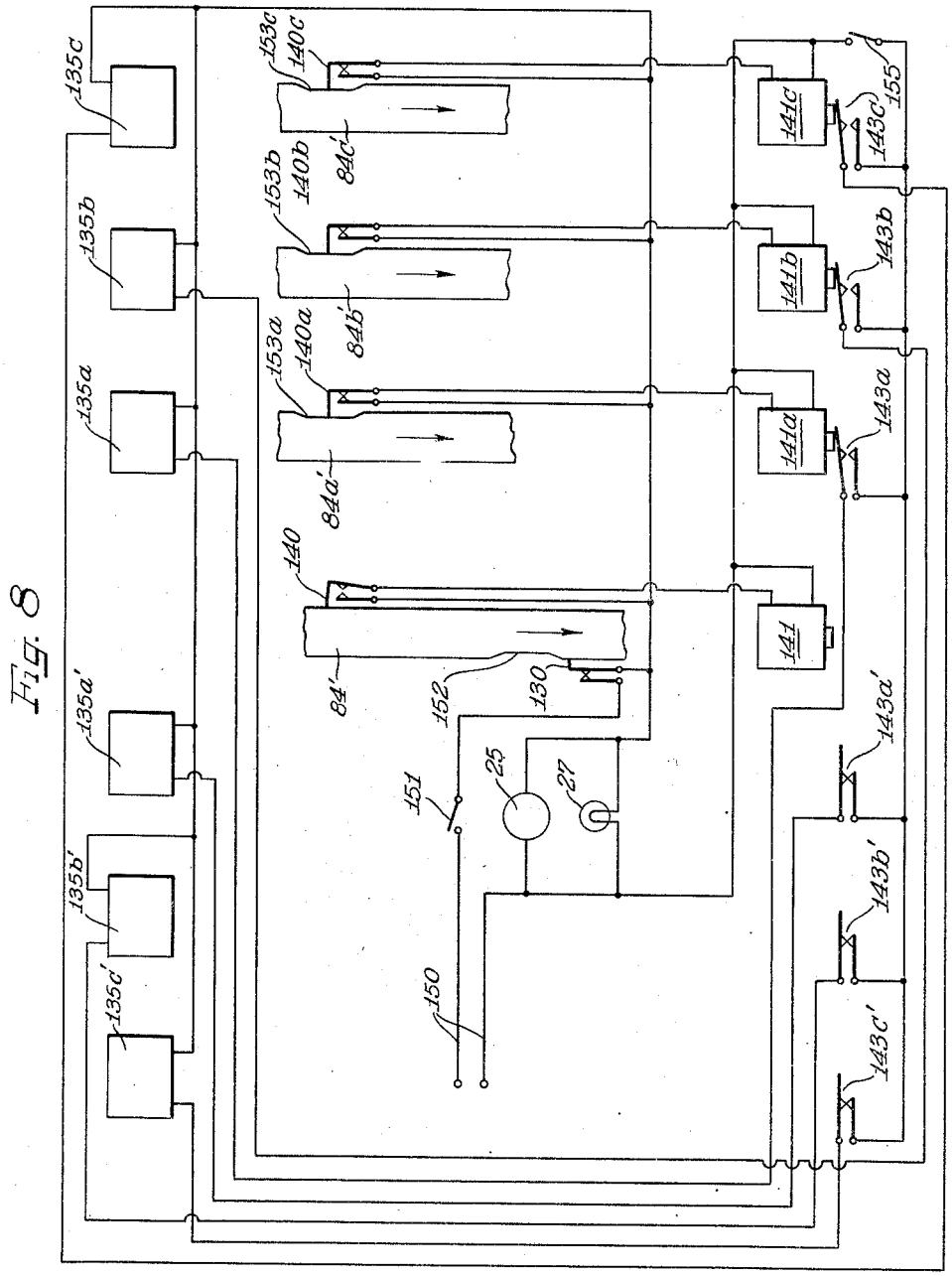

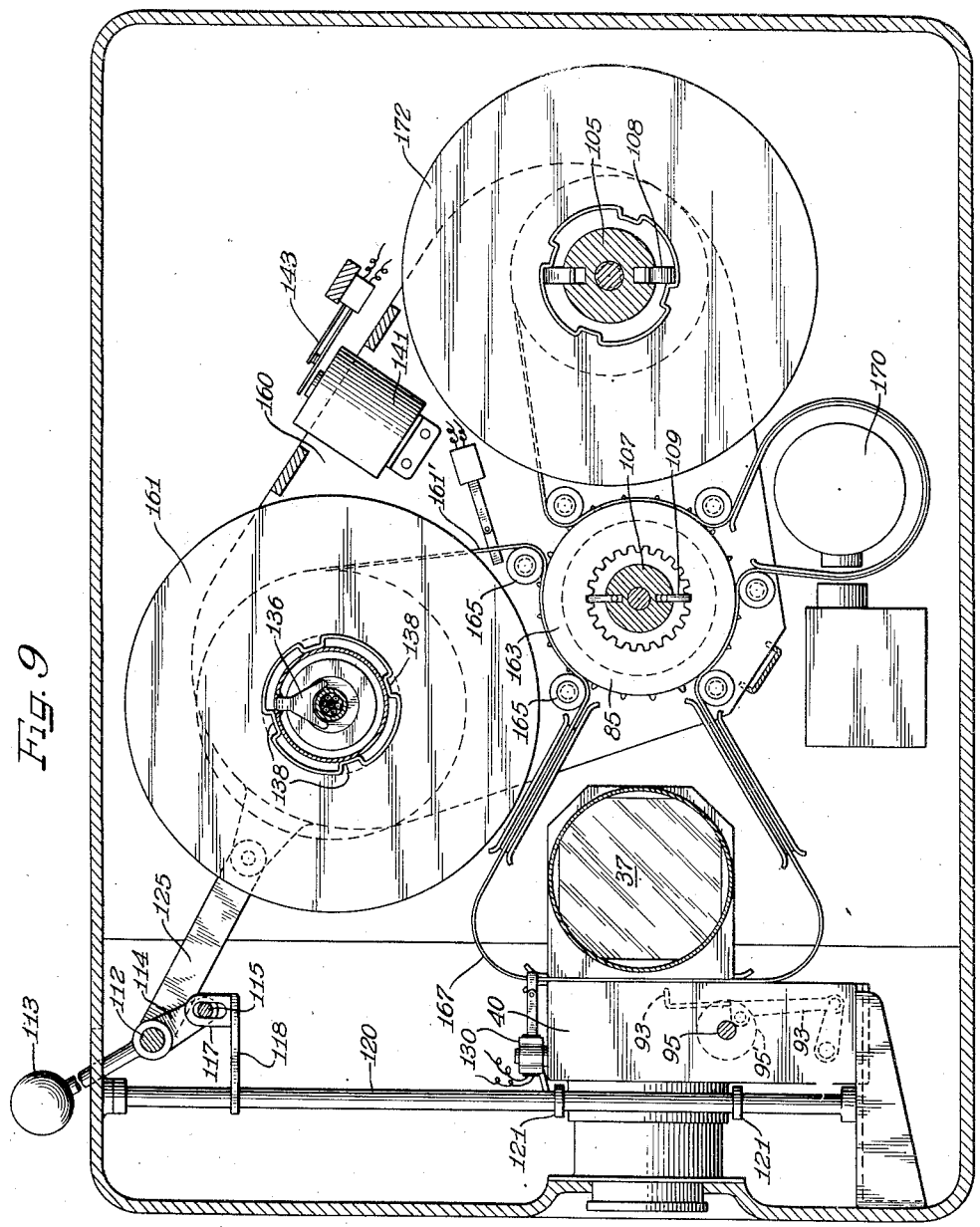

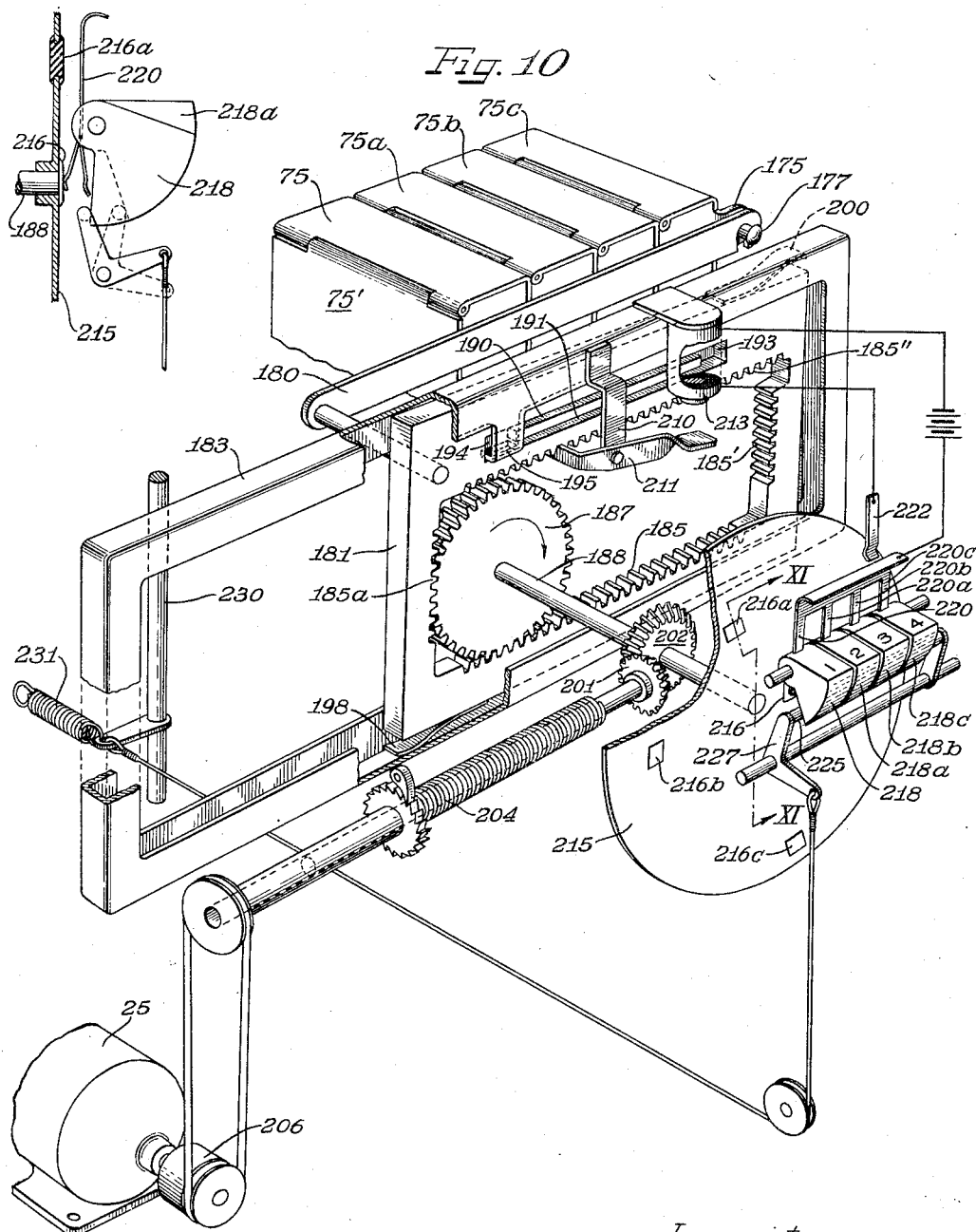

Patented July 24, 1951

2,561,503

UNITED STATES PATENT OFFICE 2,561,503

MULTIPLE WHEEL COMPARTMENT PROJECTOR

Manuel L. d'Ornellas, Buenos Aires, Argentina

Application July 7, 1948, Serial No. 37,323

13 Claims. (Cl. 88—17)

This invention relates to cinema projectors and more particularly to a multi-reel cinema projector.

In projectors adapted to project cinema or so-called moving pictures, the usual practice is to have a single reel mounted in the projector and to change reels at the end of each film. This causes undue delay and annoyance to the audience.

It is an object of the present invention to provide a cinema projector which will reduce the delay between the showings of reels.

Another object of the invention is to provide a cinema projector which will eliminate waste time required to rewind films.

A further object of the invention is to provide a single cinema projector which will be capable of performing the functions of a plurality of projectors.

It is another object of the invention to reduce the cost and increase the efficiency of cinema projectors.

Another object is to provide a cinema projector having a plurality of reels mounted therein in which portions of a reel may be shown intermediate the showing of portions of other reels.

A still further object of the invention is to provide a cinema projector having a plurality of reels which will automatically rewind each reel after exposure.

It is also an object of the invention to provide a cinema projector which will shut down the machine at the conclusion of a reel.

A further object is to provide a cinema projector in which any one of a plurality of reels may be selected for projection.

Another object of the invention is to provide a cinema projector which will automatically start operation of the machine upon positioning of a film in projecting position.

A further object is to provide a cinema projector in which a plurality of reels may be set up in the machine in advance to be projected and automatically rewound at the conclusion of each reel.

A still further object of the invention is to provide a cinema projector which will reduce the amount of work required to operate the machine.

A further object of the invention is to provide a cinema projector having a projecting position and a plurality of reels mounted in said machine in which reels out of projecting position are automatically rewound.

A still further object is to provide a cinema projector with an automatic rewind which will automatically cut out prior to disengagement of the film on the rewind reel.

Another object of the invention is to provide a simplified rewind mechanism for cinema projectors.

A further object is to provide an improved and simplified selector for cinema projectors.

In accordance with the general features of this invention there is provided in a cinema projector including a housing and picture projecting light means, multiple sets of film reels in the housing, each set including a supply reel and a wind-up reel, and means for selectively and bodily shifting the sets of reels in the housing to position any desired supply reel in projecting position without necessitating removal of any of the reels from the housing.

Another object is to provide an improved take-up mechanism for the rewind reel in cinema projectors.

Another feature of the invention relates to providing in the foregoing projector means for contemporaneously positioning a previously used supply reel in a rewind position.

Still another feature relates to the provision in the aforesaid projector of means automatically operable upon shifting of the reels to rewind the film back on the previously used reel without necessitating removal of each used reel and its wind-up reel from the projector.

Yet another feature of the invention relates to the provision in the foregoing projector of a selective means in the form of manually accessible means for effecting shifting of the reels and changing of one film to another for projection without removal of the reels and film from the housing.

A further feature of the invention relates to providing a selective means in the form of manually operable push buttons corresponding in number to the number of sets of the reels.

An additional and further feature of the invention relates to the provision in the aforesaid projector of sound track means positioned to co-operate automatically with any one of the films shifted into projecting position.

A still further detail feature of the invention relates to the provision of means for shifting the picture projecting light means when the reels are shifted whereby clearance is provided for the film to be moved into and out of position without interference with the picture projecting light means.

Other objects will become apparent when considering the following specification, which, when considered with the accompanying drawings, constitute a preferred form of the invention.

On the drawings:

Figure 1 is a perspective view of the entire machine with parts thereof being broken away to more clearly illustrate other parts and portions of the machine;

Figure 2 is a vertical cross section through the machine taken on the line II—II of Figure 1;

Figure 3 is a transverse cross-sectional view through the machine and is a cross section taken on the line III—III of Figure 2;

Figure 4 is a cross section taken on the line IV—IV of Figure 3;

Figure 5 is a cross section taken on the line V—V of Figure 4;

Figure 6 is an enlarged longitudinal cross section through the film reels and the guide spools, and is a cross section taken on the line VI—VI of Figure 3;

Figure 7 is a transverse fragmental cross section taken on the line VII—VII of Figure 6, looking in the direction of the arrows;

Figure 8 is a wiring diagram showing the operation of the electric circuit in the machine;

Figure 9 is a transverse cross section similar to Figure 3 but showing a modification of the projector particularly adapted for sound reproduction.

Figure 10 is a perspective view of a second modification of the invention showing an automatic film selector; and Figure 11 is a cross section taken on the line XI—XI of Figure 10.

Referring to the drawings, and particularly to Figure 1, the projector is built in a case 20 which may be roughly rectangular in shape and formed with a partition 21 adjacent one end dividing the case 20 into two compartments generally designated 22 and 23. Access to the compartment 23 may be had through a door 24 having one end thereof connected to said compartment through a hinge 24' (Figure 2).

The compartment 22 contains a motor 25 which furnishes power to operate all moving parts in the machine and a light 27 to furnish the illumination required for projection. The motor 25 has a belt drive 28 which turns a claw shaft 30. The shaft 30 contains a shutter 32, the shutter comprising a hub 33 mounted on the shaft and a pair of oppositely disposed blades 34—34. The shutter 32 is mounted on the shaft 30 between the light 27 and a light tube 35, the light tube projecting through the partition and directly aligned with the light 27. The light tube 35 terminates in a right angle prism 37 which is adapted to receive the illumination from the light 27, bend the rays thereof at right angles to their original direction and project the same through a lens 40, as shown in Figures 3 and 5. The claw shaft 30 has a pulley 42 thereon which drives a hollow rewind shaft 45 through a suitable belt 46. The hollow rewind shaft 45 may be mounted between an external bearing 48 in the partition 21 and an internal bearing 50 mounted on a stationary hollow shaft 52 running through the shaft 45. A bearing 55 (Figure 2) is mounted on the opposite end of the shaft 52 from the bearing 50 and supports the outer end of the hollow rewind shaft 45.

Returning again to Figure 1, the claw shaft 30 contains a third pulley 56 which drives a belt 58, which turns a take-up shaft 60. The take-up shaft 60, in turn, has a pulley 62 mounted thereon which drives a pulley 63, the pulley 63 turning a drive shaft 65. The shafts 60 and 65 may be mounted between the bearings in the walls of the compartment 22 and operate in tubes 66 and 67, respectively, which are formed integrally on the wall 21 perpendicular thereto, as best seen in Figure 2, and project into the compartment 23 toward a multiple reel case generally designated 70. The tubes 66 and 67 each contain bearings 72 at both ends of the tubes 66 and 67, which support the shafts 60 and 65 through substantially their entire length.

Again referring to Figure 2 the reel case 70 may be formed of a plurality of separate compartments 74, 74a, 74b and 74c, the letters "a," "b" and "c" designating compartments identical to 74, which of themselves will not be described in detail, the description of one of which serves for all. In the ensuing portion of this specification, a similar designation will be carried out for other parts, the lettered parts corresponding to a similar part unlettered.

Compartments 74 are composed of an L-shaped plate 75, having a hinge 76 on the outer end of the shorter leg of the L, which is adapted to be connected to the next plate 75, each plate 75 forming a partition between two adjacent compartments. An end plate 75' provides a closure for the first compartment. The open legs of the longer of the sides of the L are held together in properly spaced relation by a gang lock 78, which simultaneously spaces the open ends of the L and locks the same in properly spaced positions. Each side of the compartments 75 is provided with a plurality of apertures. The upper portion of the compartments contain apertures 80 about which bearings 82 are mounted on both sides of each plate 75. The bearings 82 thus project inwardly on both sides of each compartment to receive a film reel 84, 84a, 84b and 84c, the bearings 82 providing substantially frictionless rotation for the reels.

The walls 75', 75, 75a, 75b, 75c, each contain apertures to rotatably support drive spools 85, 85a, 85b and 85c. The drive spools are adapted to receive the film from the reel 84, as best seen in Figures 3 and 7, which is guided around rollers 87 onto the drive spools 85, from whence the film projects through guides 90 to a loop 91. The loop 91 carries a film in between the lens 40 and the prism 37 for actuation by a claw 93. The claw 93 is connected to the claw shaft 30 by a flexible cable 95, as best seen in Figures 4 and 5.

The opposite end of the loop 91 passes through a guide 96 over rollers 97 from whence it passes over the drive spool 85 and onto the rewind reels 100 (Figure 3). The rewind reels 100 are mounted on bearings 102, 102a, 102b, 102c similar to bearings 82, supported by the walls 75, 75a, 75b, 75c, and the walls 75' of the multiple reel case 70. The bearing 102 surrounds apertures in the wall to permit the reel case 70 to pass over a driving spindle 105 on the end of the take-up shaft 60. Similarly, the hollow interiors of the guide spools 85, 85a, 85b, 85c pass over a drive element 107 mounted on the end of the drive shaft 65.

Driving spindles 105 and 107 are driven synchronously from the motor 25 as heretofore explained. Both driving spindles 105 and 107 have spring fingers 108 and 109, respectively, which bow outwardly to engage projections in the interiors of the reels 100, 100a, 100b, 100c, and the spools 85, 85a, 85b, 85c, respectively, to drive those elements when those elements are in projecting position in the machine.

The entire multiple reel case 70 is receivable in the machine through the door 24, the multiple reel case 70 being receivable over the hollow rewind shaft 45 and over the end of the drive spindles 105 and 107. The multiple reel case 70 is adapted to be slid along to one of four positions on the shaft 45 so as to successively or selectively bring one of the reels 84, 84a, 84b, 84c opposite the lens 40, by means of a shifting mechanism, best shown in Figures 1, 3, 4 and 5.

Referring to those figures, and particularly to Figure 1, the shifting mechanism is built on a shaft 112 mounted between the walls of compartment 23. The shaft 112 has a lever and handle 113 fixed thereon which is adapted to rotate the shaft in shifting the reels. The shaft 112 is adapted to slide and rotate in the two walls of the compartment. The shaft has a pair of parallel arms 114 mounted therein which carry a rod 115. The rod 115 is engageable in an aperture in an upstanding leg 117 of a crank 118. The crank turns a vertical shaft 120. The shaft, as will be seen in Figures 4 and 5, has a yoke 121 mounted thereon which engages trunnions 123 on the lens box 40 to move the lens box out of engagement with the prism 37. When the lens box 40 is moved out of engagement with the prism 37, the lever 113 may be moved to shift the shaft 112 longitudinally in the machine. The shaft 112 being connected to the multiple reel case 70 through a link 125 moves the entire multiple reel case along the rewind shaft 45 to a position corresponding to notches 126. The notches 126 are so positioned in a slot 127 that when the lever 113 is moved into the notch, a film from a corresponding reel 84, 84a, 84b, 84c is opposite the lens box 40. Moving the lever 113 into the slot moves the film box back into engagement with the prism 37 and clamps the reel in position for projection.

A switch 130 is pivoted about a point 131 (Figure 5) on the top of the lens box 40 and is moved out of engagement with the film by a link 132 to the dotted position 130' when the lens box moves forwardly away from the prism 37. In this position the contacts of the switch are separated and the circuit is broken. The same result is attained when the film is completely run, in which position the arm of the switch adjacent the film moves into a notch on the film to break the circuit across the switch. The effect of the breaking of the circuit to the switch 130 will be discussed below.

As will be seen from Figure 1, the shafts 60 and 65 and the hollow rewind shaft 45 operate constantly as long as the motor 25 is running. The shaft 45 contains a plurality of electromagnets 135a, 135b and 135c, and 135a', 135b', 135c', which are mounted on the stationary hollow shaft 52. The magnets 135 do not rotate with the shaft 45 but are stationary on the shaft 52. The shaft 45 has a plurality of apertures therein which receive the inturned ends of spring drive members 136. The shaft 45 is also deformed inwardly to form depressions 137 so that the central portion of the spring drive members 136 will lie in the depressions 137 when the drive members 136 are in their normally unflexed position. The drive members 136 are moved into their flexed bowed position as shown opposite the reel 84a in Figure 2, by magnetization of the reels 135a, 135b, 135c or 135a', 135b', 135c'. When flexed, as seen opposite the reel 84a (Figures 6 and 7), the spring drive members 136 engage projections 138 in the reels 84, 84a, 84b or 84c to rewind the film from the reels 100, 100a, 100b, 100c over the drive spool 85 and onto the original reel 84, 84a, 84b, 84c when the reels are out of projecting position, as will be clear from the explanation of the wiring diagram shown in Figure 8.

Control switches 140, 140a, 140b, 140c (Figures 1 and 3) are mounted on the long legs of the L-shaped compartments 74 approximately opposite the rollers 87. The switches 140 are normally open and are closed at the beginning of the reel when the longer arm of the switch 140 feeling the edge of the film drops into a notch at the beginning thereof. The switch 140 is adapted to stop rewinding of the film, as will be explained in a description of Figure 8.

Similarly, electromagnets or relays 141 are mounted in each compartment 74, 74a, 74b, 74c adjacent the switches 140 and are controlled thereby. The magnets 141 are adapted when energized to open switches 143a, 143b, 143c and 143a', 143b', 143c'. The switches 143 are mounted from the side wall of the compartment 23, a switch being provided for each possible position of each of the reels except the projecting position. The switches 143 are stationary and do not move with the multiple reel case 70'.

Referring to Figure 8, which shows the electrical connections of the machine together with the film 84' from the reel 84, the film 84a' from the reel 84a, the film 84b' from the reel 84b, and the film 84c' from the reel 84c, the power enters the machine from any given source through a pair of conductors 150 and passes a master switch 151 (which may be a hand actuated snap switch) to start the machine.

If a film 84', 84a', 84b' or 84c' is in projecting position (in the instant case reel 84 being shown in projecting position) then the switch 130 feels the left-hand edge of the film 84' and is closed thereby to complete the circuit to the motor 25 and the light 27, thus starting the motor and lighing the light simultaneously. At the completion of the reel 84, the feeler finger of the switch 130 drops into a camming recess or notch 152, opening the switch 130, cutting off the power to the motor 25 and the light 27, and stopping operation of the machine.

During the time the film 84' is being projected, the current also flows from the line 150 to switches 140, 140a, 140b, 140c. In the normal position, i. e. the reel partly shown, the feeler arm of switch 140 rides in the position shown in film 84', maintaining the switch open thus preventing power from reaching the electromagnets 141, 141a, 141b, 141c from the line 150. When there is no current in the magnets 141, 141a, 141b, 141c, the switches 143 are closed. When the switches 143a, 143b, 143c, and 143a', 143b', 143c' are closed, power is supplied from the lines 150 to the switches 143, to the electromagnets 135a, 135b, 135c and 135a', 135b', 135c', respectively, in the hollow shaft 45, causing those magnets to draw the two ends of the spring drive members 136 toward the magnets (as seen in Figure 6) and bow the center portion thereof outwardly into engagement with the projections 138 on the reel 84, 84a, 84b, or 84c to rewind the film 84', 84a', 84b', or 84c' on their respective reels. When the reel approaches the beginning thereof, the feeler arms on the switches 140 drop into camming recesses or notches 153a, 153b, 153c in the film to close the switch and energize the respective magnets 141, 141a, 141b, 141c, thus opening the contacts 143a and de-energizing the magnets 135a, 135b, 135c or 135a', 135b', 135c', to allow the spring drive members 136 to return to their normal unflexed position and stop the rewinding.

A switch 155 is adapted to selectively control the flow of current to the switches 143a, 143b, 143c, and 143a', 143b', 143c', so as to prevent rereeling, if desired.

The form of the invention shown in Figure 9 is similar to that shown in Figures 1 to 8, and similar parts will be designated by similar letters, and no further description of such parts will be given.

Referring to Figure 9, the reels are mounted in a multiple reel case 160, containing a plurality of reels 161 which contain film 161', which passes over a drive spool 163 and held therein by rollers 165. The film 161 passes in a loop 162 between the prism 37 and the lens box 40, back to the spool and past a sound feeler 170, from whence it returns to the drive spool 163 and to the rewind reel 172.

The sound feeler reproduces the sound from a sound track on the edge of the film and transmits the sound to loud speakers (not shown).

The remaining portion of Figure 9 will be readily understood from the forgeoing description of Figures 1 to 8, inclusive.

Operation

In operation, the projector is first loaded by opening the door 24 about the hinge 24', and removing the multiple reel case 70. The gang lock 78 is unlocked and the three compartments 74, 74a, 74b are hinged back to expose compartment 74c. A reel of film 84c is placed between the bearings 82c and the film threaded under the rollers 87c and over the drive sprocket 85c, with the apertures in the edge of the film engaging corresponding teeth on the sprocket. The film is threaded through the guide 90 into a loop 91, back through the guide 96, under the rollers 97, over the drive spool 85, and fastened to the rewind reel 100c.

The next section of the multiple reel case is then folded down on the section 74c, so that the upper bearings 82c engage the reel 84c and the lower bearings 102c engage the rewind reel 100c. The reels 84b, 84a, 84 are then set up in their compartments in a similar manner, and the gang lock 78 locked over the plate 75' to complete the unit.

It will be noted that each of the reels 84, 84a, 84b and 84c have similar loops 91 projecting in front of the multiple reel case. The loaded multiple reel case may then be inserted in the machine with the reels 84, 84a, 84b, 84c fitting over the hollow rewind shaft 45 and the first spool 85 engaging over the drive spindle 107, and the first rewind reel 100 engaging over the take-up spindle 105. One of the loops 91 will then lie between the prism 37 and the lens box 40.

The link 125 may then be connected to the multiple film case 70 by means of a thumb screw 125' and the multiple film case 70 moved by means of the lever and handle 113 so as to place any film desired in projecting position opposite the lens box 40. Moving the lever 113 into one of the notches 126 turns the shaft 120, causing the yoke 121 to move the lens box to the rear into engagement with the film loop 91. When the lever 113 is engaged in one of the notches 126, one of the films 84', 84a', 84b' or 84c' is directly opposite the lens box 40 and hence may be clamped in position to be projected. When the loop 91 of one of the films 84 is clamped in position by movement to the rear of the lens box 40, the switch 130 is moved into engagement with the left edge of the film, as seen in Figure 5, closing the switch. If the master switch 151 is also closed, current flows through the lines 150, through the switch 151, and through the switch 130 to start the motor 25 and light the light 27. The light 27 throws its rays down the light tube 35 where they are bent at right angles by the prism 37 to pass through the film 84' and the lens box 40 to project film 84' onto the screen (not shown).

The motor 25, when started, drives the claw shaft 30 through the belt 28 to rotate the flexible shaft 95 and the crank shaft 95'. As the crank shaft 95' rotates, it oscillates the claw 93, the end of which moves up and down to alternately engage in the apertures in the edge of the film 84', advance the film one frame, retract from the film, and return to its upper position to again engage the film. As the film 84 moves under the influence of the claw 93 and the drive shaft 107, the solid blades 34 of the shutter 32 pass between the light source 27 and the light tube 35 to cut off light from the light tube.

During the time the film is stationary, as the claw returns from its lowermost position to its uppermost position, the blank portions of the shutter 32 are opposite the light tube 35 to permit light to be projected from the source 27 through the film.

It will be noted that as the claw 93 moves the film past the lens, the drive shaft 65, which is operated from the motor 25, turns the drive sprocket 85 to move the film around the loop and return the same towards the reel 100. The shaft 65 is synchronized in speed to the speed of movement of the claw 93 so that film feeds to the claw at the same rate as the speed of the claw. It will also be noted that the reel 100 during periods of exhibiting a film from the reel 84 is rotated by the take-up spindle 105 through the constantly rotating shaft 60.

At the end of each film, on the left hand side thereof, as seen in Figures 5 and 8, is a notch 152 which extends for a considerable length on the film. When the switch 130 engages the notch 152, the switch 130 opens to break the circuit from the power line 150 through both the motor 25 and the light 27. Power is also cut off from the relays 141, 141a, 141b, 141c, and also the magnets 135a, 135b, 135c, and 135a', 135b', 135c'. The reels 84 may then be shifted by disengaging the lever 113 from its notch 126 which moves the lens box 40 out of engagement with the prism 37 which frees the projected film for movement. The lever 113 may then be moved in the slot 127 until it is opposite a desired notch 126. When the lever 113 is opposite a notch 126, another film is in position to be projected.

By moving the lever 113 into the notch, the lens box moves back to grip the film and the switch 130 moves into engagement with the edge of the film to complete the circuit across the switch 130. The circuit is thereby completed across the switch 130, the light 27 relights and the motor 25 restarts to drive shafts 30, 45, 60 and 65.

With the film 84' previously projected from the reel 84 and wound on the rewind reel 100, the reels 84 and 100 upon movement of the lever 113 would come opposite a non-projecting position on the shaft 45. In this position the feeler switch 140 would be riding along the right hand edge of the film, as seen in Figures 1 and 8, and would normally be open. The relays 141, 141a, 141b, 141c would also be deenergized, and switches 143a, 143b, 143c and 143a', 143b', 143c' opposite a deenergized relay 141, 141a, 141b, 141c would be closed. Current would then flow from the line 150 through the closed switch 155, through each of the closed switches 143a, 143b, 143c and 143a', 143b', 143c', to energize the corresponding magnets 135a, 135b, 135c and 135a', 135b', 135c', causing the magnets to attract opposite ends of the bowed clutch member 136 and to bow the center of the member 136 outwardly into engagement with its reel 84, 84a, 84b, 84c to rewind the film from the corresponding reels 100, 100a, 100b, 100c.

At the completion of the rewind operation, the switch 140, 140a, 140b, 140c engage in notches 153, 153a, 153b, 153c, in the right hand edge of the film, permitting the switches 140, 140a, 140b, 140c to close and energize the corresponding relay 141, 141a, 141b, 141c. Closing the relays 141, 141a, 141b, 141c, will open the corresponding switch 143a, 143b, 143c and 143a', 143b', 143c' to break the circuit to the magnets 135a, 135b, 135c or 135a', 135b', 135c'. When the magnets 135a, 135b, 135c and 135a', 135b', 135c' are deenergized they release the bowed clutch 136 and stop rewinding of the film. Thus the beginning of the film is retained on the lower or rewind drum and may be projected at a later period by again shifting that film to projecting position. Similarly, the next two films may be projected either on the order set up or at will. If it is desired to project a part of a film and intersperce between the parts of a film parts of a different film, the switch 155 is opened, thus stopping the actuation of the entire rewind mechanism and permitting the film to be partly shown, another film partly shown, and the first film continued at the place where projection was halted.

It will be noted in regard to this construction that there is no magnet 135 opposite the projecting position since rewinding the reels 84 does not occur until the reel is out of projecting position.

It will also be noted that the drive spindles 105 and 107 operate only on the film in projecting position, and hence there is no power on any drive spindle out of projecting position or on any rewind reel out of projecting position, and the film may be completely rewound on its corresponding reel when out of projecting position.

Referring now to Figures 10 and 11 which show a modification comprising an automatic selector for use with the projector, the film cases 75, 75a, 75b and 75c have an ear 175 retaining a pin 177. The pin is engaged by a connecting rod 180 which joins the pin 177 with a yoke 181. The yoke 181 slides in a frame 183 supported from the case 20 (Figure 1). The yoke 181 is provided with teeth 185 on the inner periphery thereof on which a gear 187 operates. The gear 187 is mounted on a shaft 188, which is in turn bearinged in the projector case 20 so that as the gear 187 rotates in the direction shown by the arrow, it reciprocates the yoke 181 laterally in the frame 183.

The yoke 181 is provided with a pair of slots 190, 191, running for the length of movement of the yoke 181 in the frame 183. The slots have openings 193 and 194 between ends of the slots to permit a finger 195 formed on the frame 183 and receivable in the slots to pass from the upper to the lower slot at the end of the movement of the yoke 181.

As the gear 187 rotates in the direction shown, moving the yoke 181 from the position shown in Figure 10 and toward the left, the finger 195 rides in the lower slot 119 and the left-hand side of the yoke 181 is held above the bottom of the frame 183 by a spring 198. When the yoke 181 is at its left-hand extremity of movement, teeth 185' are engaged in the gear 187 forcing that end of the yoke down and bringing the finger 195 into engagement with the upper slot 190.

Further rotation of the gear 187 starts the return stroke of the yoke 181 along teeth 185", the finger 195 riding in the upper slot 190 and a spring 200 urging the right-hand side of the yoke 181 against the bottom of the frame 183. When the yoke 181 is at the extreme other or right-hand end of its stroke, the gear 187 engages teeth 185a on the yoke, forcing the yoke up, and the finger 195 then enters lower slot 191. The gear 187 is driven by a pair of bevelled gears 201, 202 by a servo motor 204. The motor is wound and kept constantly tensioned by the motor 25, a friction clutch 206 being provided to stop rewinding of the servo motor when it is properly tensioned. Operation of the servo motor is controlled by a stop means comprising a bracket 210 fixed to the frame 183 and carrying pivotally finger 211, one end of which is normally engageable with the teeth 185" along the upper side of the yoke 181.

An electromagnet 213 is adapted upon energization to raise one end of the finger 211 to release the rack for movement by the servomotor 204. Energization of the magnet 213 is controlled by a disc 215, mounted on the shaft 188 and rotatably therewith. The disc 215 is provided with a plurality of staggered insulated spots 216, 216a, 216b and 216c. A plurality of manually and selectively engageable buttons 218, 218a, 218b and 218c are each provided with a contactor 220 which, when a button is depressed, moves into engagement with the disc 215, thus completing the circuit from the battery through one of the contacts 220, 220a, 220b or 220c, and through a brush 222 to the electromagnet 213. The energization of magnet 213 draws the right-hand end of the finger 211 into engagement with the magnet and releases the rack 181 for movement by the servomotor. The insulating contacts 216, 216a, 216b and 216c are so staggered radially around the disc as to be contacted by their respective contacts 220, 220a, 220b and 220c. Their position circumferentially on the disc is such that the insulating contacts 216, 216a, 216b and 216c fall under their respective contacts 220, 220a, 220b and 220c at positions when the film cases 75, 75a, 75b and 75c are in position to project film from that case.

When a contact 220 rides over an insulating contact 216, the current is broken to the electromagnet 213 and a left-hand end of the finger 211 drops, allowing the finger to engage in the rack and stop the movement of the yoke 181 in position to project a film. When a button is pressed, the lower side of the button presses against the rod 225, which operates a bell crank lever 227 which turns a rod 230 under the influence of a spring 231. The rod 230 moves the lens box 40 out of engagement with the film to permit the film cases 75, 75a, 75b and 75c to move.

*In operation*

A film is selected for projection by pressing one of the buttons 218, 218a, 218b and 218c. Pressing the buttons 218, 218a, 218b and 218c moves the free end of the bell crank lever 227 upwardly, turning the rod 230 and separating the lens box 40 from the fuse. Simultaneously contact is made between one of the contacts 220, 220a, 220b and 220c and the disc 215, causing current to flow from the battery through the contacts 220, 220a, 220b and 220c, through the disc 215, through the brush 222, to energize the electromagnet 213, causing the finger 211 to move upwardly and out of engagement with the rack 185", and permit the servomotor 204 to drive gears 201, 202 and 187, to simultaneously move the rack 181 and turn the disc 215.

Moving the rack 181 moves the film cases 75, 75a, 75b and 75c on the rewind tube 45 (Figure 1). When the proper film is indicated by the buttons 218, 218a, 218b and 218c and comes opposite the lens, the contacts 220, 220a, 220b and 220c engages with the corresponding contact 216, 216a, 216b and 216c to break the contact to the electromagnet and causes the finger 211 to engage in the rack 185" and stop movement of the yoke 181.

The button 218, 218a, 218b or 218c is then released and the spring 231 acts on the rod 230 to reengage the projecting lens 40 with the film and start projection.

It will be noted that while I have illustrated my invention as being used with cinema projectors it can be employed equally well with other types of reproducers such as well known sound recorders and reproducers using magnetized wire and tapes in lieu of film.

It will be realized that the hereinabove described invention is to be taken merely as a preferred form thereof and that various changes in size, shape and arrangement of parts may be made without departing from the spirit of the invention or the scope of the subjoined claims.

That which is claimed as new and is desired to be secured by United States Letters Patent is:

1. In a projector, a multiple reel case comprising a plurality of compartments, means to rotatably support a reel of film in each of said compartments, means to support a rewind reel in each of said compartments, means to mount said multiple reel case in said projector, and means to shift bodily said multiple reel case in the projector to bring a selected film into projecting position said compartments having hinged side plates permitting pivoting separation of said compartments for replacing one reel without disturbing reels in adjacent compartments.

2. In a projector including a projecting lens and a source of light, a reel case, a first reel containing a film to be projected, means to mount said reel rotatably in one end of said film case, a second reel in a plane of said first reel adapted to receive projected film from said first reel, means to mount said second reel rotatably in the opposite end of said multiple reel case, a drive spool, means to mount said drive spool rotatably in said reel case intermediate said reels, said drive spool receiving film from said first named reel to guide the same past the projecting lens and deliver the projected film to said second named reel, a hollow rotating shaft adapted to mount said reel case, means to move said reel case on said rotating shaft to shift said film into and out of projecting position, means when said film is in projecting position to drive said spool and said second named reel, an electromagnetic clutch in said rotating shaft adapted to engage the first named reel when said film is out of projecting position to rewind film from said second named reel onto said first named reel, and means to disengage said clutch at a desired point on the film to stop rewinding.

3. In a projector including a projecting lens and a source of light, a reel case, a first reel containing a film to be projected, means to mount said reel rotatably in one end of said film case, a second reel in a plane of said first reel adapted to receive projected film from said first reel, means to mount said second reel rotatably in the opposite end of said multiple reel case, a drive spool, means to mount said drive spool rotatably in said reel case intermediate said reels, said drive spool receiving film from said first named reel to guide the same past the projecting lens and deliver the projected film to said second named reel, a shaft adapted to mount said reel holder, means to rotate said shaft constantly, means to move said reel case axially on said shaft to shift said film into and out of projecting position, means when a film is in projecting position to drive said spool and said second named reel in a direction contra to said shaft, means on said rotating shaft to engage the first named reel when said film is out of projecting position to rewind film from said second named reel onto said first named reel, and means to disengage said last named means to stop rewinding at a desired point on the film.

4. In a projector including a projecting lens and a source of light, a reel case, a pair of spaced bearings mounted in said reel case, a first reel containing a film to be projected mounted in one end of said film case on one of said bearings, a second reel in a plane of said first reel adapted to receive projected film from said first reel, said second reel being mounted to rotate on the other said bearing in the opposite end of said multiple reel case, a drive spool, means to mount said drive spool rotatably in said reel case intermediate said reels, said drive spool receiving film from said first named reel to guide the same past the projecting lens and deliver the projected film to said second named reel when said reel is in projecting position, a hollow shaft adapted to mount said reel holder, means to rotate said shaft constantly in one direction, means to move said reel case axially on said rotating shaft to shift said film into and out of projecting position, means when a film is in projecting position to drive said spool and said second named reel in a direction contra to said shaft, a magnetic clutch in said rotating shaft to engage the first named reel when said film is out of projecting position to rewind film from said second named reel onto said first named reel, and means to disengage said clutch at a desired point on the film.

5. In a projector including a source of light and a projecting lens, a support structure, a carriage slidably movable on said structure, a plurality of reels secured to said carriage for movement to and from projecting position, a power driven gear mechanism tending to slide said carriage, a trip engaging said carriage to prevent movement thereof, a magnet for releasing said trip to permit movement of said carriage, a plurality of selectively operable levers corresponding respectively to said reels, each lever being effective upon actuation to energize said magnet and release said trip, a disk driven by said gear mechanism having contact points spaced according to the spacing of said reels on said carriage, each contact point being movable against a corresponding lever to de-energize said magnet and reset said trip only when said lever has been selectively actuated.

6. In a projector including a source of light and a projecting lens, a support structure, a carriage slidably mounted in said structure, power means tending to slide said carriage, a plurality of film carrying reels secured to said carriage for movement therewith, the movement of said carriage determining the selective positioning of the film from one of said reels in projecting position, a trip mechanism engaging said carriage to prevent movement thereof, a selectively operable lever corresponding to each reel and connected to said trip mechanism for releasing said carriage for sliding movement by said power means, an indexing means driven by said power means and having contact members corresponding respectively to said reels, the contact of one of said members with a selectively operated lever effecting resetting of said trip mechanism and stopping of said carriage with the selected reel in projecting position.

7. In a projector, a support structure, a lens housing on said structure, a carriage slidable in said structure, a plurality of aligned supply and rewind reels mounted on said carriage for movement to and from projecting position adjacent said lens housing, a mechanism mounted for sliding movement on said housing and arranged to intermittently contact said film to move it from a supply reel to a rewind reel, a linkage for sliding said mechanism, a power driven gear mechanism operable to actuate said linkage and to slide said carriage, a trip engaging said carriage to prevent movement thereof, a magnet for releasing said trip to permit movement of said carriage, a plurality of selectively operable levers corresponding respectively to said reels, each lever being effective upon actuation to energize said magnet to release said trip and actuate said linkage, a disk driven by said gear mechanism having contact points spaced according to the spacing of said reels on said carriage, each contact point being movable against a corresponding lever to de-energize said magnet and reset said trip.

8. In a projector, a multiple reel case comprising a plurality of compartments, means to rotatably support a reel of film in each of said compartments, means to support a rewind reel in each of said compartments, a rotating shaft having a portion disposed in said multiple reel case, means to shift said multiple reel case in said projector to bring a selected film into projecting position, and individually operable connecting means on said rotating shaft for connecting the same to any of said first named reels which has had its film projected to rewind the film on the reel when the same is out of projecting position within the projector.

9. In a projector, a multiple reel case comprising a plurality of compartments, means to rotatably support a reel of film in each of said compartments, means to support a rewind reel in each of said compartments, a rotating shaft having a portion disposed in said multiple reel case, means to shift said multiple reel case in said projector to bring a selected film into projecting position, individually operable connecting means associated with said rotating shaft for connecting the same to any of said first named reels which has had its film projected to rewind the film on the reel when the same is out of projecting position within the projector, and means to stop the rewinding operation before the end of the film.

10. In a projector of the character described, a multiple reel case comprising a plurality of compartments, each compartment adapted to hold a film reel, a bearing in each of said compartments adapted to receive the reel and rotatably support the same in said compartment, a second bearing in each compartment, a second reel in each compartment adapted to be received and rotatably supported by said second bearing, said second reel receiving film from said first reel, a rotating shaft adapted to receive and support said multiple reel case in the cinema projector with the film from one of said reels lying in projecting position, means to shift said multiple reel case axially on said shaft to selectively position each of said reels, and individually operable clutches associated with said rotating shaft for rewinding any projected film on its corresponding first mentioned reel during the projection of the film on any of the other of said first mentioned reels.

11. In a projector including a housing and picture projecting light means, a plurality of sets of film reels in said housing, each set including a supply reel and a wind-up reel, means for selectively and bodily shifting said set of reels in the housing to position any desired supply reel in projecting position and contemporaneously positioning the previously used supply reel in rewind position, and independent drive means automatically operable upon shifting of the reels to rewind the film back on the previously used reel, said drive means including individually operable clutches operable for rewinding the previously projected film contemporaneously with the projection of film on any other reel.

12. In a projector, a reel case, a supply reel and a rewind reel rotatably mounted in said case, a film disposed around said reels having a first camming recess on one marginal edge near the end of the film and a second camming recess on the opposite marginal edge at the beginning of the film, a drive spool for transferring the film from the supply reel to the rewind reel, power operated drive means for operating said drive spool, a rewind mechanism for transferring the film from the rewind reel back to the supply reel, a follower movable into said first camming recess to mechanically cut off the power to said drive means to stop the unwinding of film from said supply reel, manual means for shifting said reel case to place said reels in rewind position and to connect the power to said drive means, and a second camming arm movable into said second camming recess to actuate said rewind mechanism to transfer film back to the supply reel.

13. In a projector including a source of light and a projecting lens, a support structure, a carriage slidably mounted in said structure, power means tending to slide said carriage, a plurality of film carrying reels secured to said carriage for movement therewith, the movement of said carriage determining the selective positioning of the film from one of said reels in projecting position, a stop mechanism engaging said carriage to prevent movement thereof, a selectively operable element corresponding to each reel and connected to said stop mechanism for releasing said carriage for sliding movement by said power means, an indexing means having contact members corresponding respectively to said reels, the contact of one of said members with a selectively operated element effecting resetting of said stop mechanism and stopping of said carriage with the selected reel in projecting position.

MANUEL L. D'ORNELLAS.

REFERENCES CITED

The following references are of record in the file of this patent:

UNITED STATES PATENTS

| Number | Name | Date |
|---|---|---|
| Re. 16,769 | Gauriat | Oct. 11, 1927 |
| 1,313,733 | Ramsher | Aug. 19, 1919 |
| 1,802,595 | DeForest | Apr. 28, 1931 |
| 2,214,468 | Lannerd | Sept. 10, 1940 |
| 2,227,259 | Hokanson | Dec. 31, 1940 |
| 2,256,739 | Graves | Sept. 23, 1941 |
| 2,319,530 | Bolsey | May 18, 1943 |
| 2,416,210 | Osborne | Feb. 18, 1947 |
| 2,434,201 | Engelken | Jan. 6, 1948 |

FOREIGN PATENTS

| Number | Country | Date |
|---|---|---|
| 201,202 | Great Britain | July 30, 1923 |
| 225,631 | Great Britain | Dec. 8, 1924 |